US009117161B2

(12) United States Patent
Kondo (10) Patent No.: US 9,117,161 B2
(45) Date of Patent: Aug. 25, 2015

(54) PROFILE CREATION METHOD, NON-TRANSITORY COMPUTER READABLE RECORDING MEDIUM STORED WITH PROFILE CREATION PROGRAM, AND PROFILE CREATING APPARATUS

(71) Applicant: KONICA MINOLTA, INC., Chiyoda-ku (JP)

(72) Inventor: Katsuji Kondo, Hino (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/547,340

(22) Filed: Nov. 19, 2014

(65) Prior Publication Data
US 2015/0138576 A1 May 21, 2015

(30) Foreign Application Priority Data
Nov. 19, 2013 (JP) .................................. 2013-239289

(51) Int. Cl.
H04N 1/60 (2006.01)
G06K 15/02 (2006.01)
G06K 15/12 (2006.01)
G06K 15/10 (2006.01)

(52) U.S. Cl.
CPC .......... *G06K 15/1878* (2013.01); *G06K 15/102* (2013.01); *G06K 15/129* (2013.01); *H04N 1/603* (2013.01)

(58) Field of Classification Search
None
See application file for complete search history.

(56) References Cited

U.S. PATENT DOCUMENTS

| 7,019,868 B2 * | 3/2006 | Chang et al. .................... 358/2.1 |
| 7,369,272 B2 * | 5/2008 | Ito et al. .......................... 358/1.9 |
| 7,450,267 B2 * | 11/2008 | Ito et al. .......................... 358/1.9 |
| 7,884,966 B2 * | 2/2011 | Ishizuka .......................... 358/1.9 |
| 8,477,371 B2 * | 7/2013 | Fan et al. ........................ 358/1.9 |
| 8,630,021 B2 * | 1/2014 | Seto ................................ 358/1.9 |
| 2004/0263881 A1 * | 12/2004 | Ito et al. .......................... 358/1.9 |
| 2005/0174586 A1 * | 8/2005 | Yoshida et al. ................. 358/1.9 |
| 2007/0030505 A1 * | 2/2007 | Ito et al. .......................... 358/1.9 |
| 2007/0291312 A1 * | 12/2007 | Kaneko et al. ................. 358/2.1 |
| 2008/0037046 A1 * | 2/2008 | Nishikawa ..................... 358/1.9 |
| 2012/0113476 A1 * | 5/2012 | Yoshida et al. ................. 358/2.1 |

FOREIGN PATENT DOCUMENTS

JP 2010-130485 A 6/2010

* cited by examiner

*Primary Examiner* — Dung Tran
(74) *Attorney, Agent, or Firm* — Buchanan Ingersoll & Rooney PC (57) ABSTRACT

Provided is a profile creation method for creating a color conversion profile for an image forming apparatus which forms an image by performing, on an input color value having total use amount of color material exceeding set amount, a process for reducing the total use amount, by interpolating lattice points in a look-up table. The profile creation method includes: determining whether a point of an input color value with the total use amount of color material being equal to the set amount exists between two adjacent lattice points in the look-up table; and, when it is determined so, calculating an output color value of an interpolation point set between the two lattice points, by a polynomial interpolation method for performing interpolation calculation by using, besides output color values of the two lattice points, an output color value of a lattice point other than the two lattice points.

15 Claims, 6 Drawing Sheets

PROFILE CREATION METHOD, NON-TRANSITORY COMPUTER READABLE RECORDING MEDIUM STORED WITH PROFILE CREATION PROGRAM, AND PROFILE CREATING APPARATUS

CROSS-REFERENCE TO RELATED APPLICATION

This application is based on Japanese Patent Application No. 2013-239289 filed on Nov. 19, 2013, the contents of which are incorporated herein by reference.

BACKGROUND

1. Technical Field

The present invention relates to a profile creation method, a non-transitory computer readable recording medium stored with a profile creation program, and a profile creating apparatus, for creating a color conversion profile.

2. Description of Related Art

With the progress in developing desktop publishing (DTP) technology and the like, the use of digital printing for producing prints directly from print data by using an electrophotographic or ink-jet image forming apparatus has been more and more increasing.

Such image forming apparatus generally have limitation of the total use amount of color material such as toner or ink, in consideration of an issue of electrostatic properties and fixing performance at the time of image formation as for electrophotographic image forming apparatus, and an issue of drying properties of ink and absorbency of ink into recording paper as for ink-jet image forming apparatus.

Even for the image forming apparatus with limitation of the total use amount of color material, it is desired to produce accurate output colors of the image forming apparatus. Hence, controlling the color reproducibility of such an image forming apparatus by creating a color profile for color correction is beneficial.

There are mainly two methods of creating a color profile for an image forming apparatus with limitation of the total use amount of color material. The first method includes: outputting color charts without limiting the total use amount of color material or under a similar condition; measuring color values on the charts; and then creating a color profile which gives an output with limitation of the total use amount of color material (e.g., Japanese Patent Application Laid-Open No. 2010-130485). The second method includes: outputting color charts with limitation of the total use amount of color material; measuring color values on the charts; and then creating a color profile without taking into account limitation of the total use amount of color material.

It is easier to employ the second method than the first method, since the first method cannot be used for an image forming apparatus which is not capable of outputting color charts without limiting the total use amount of color material. However, the second method has a problem of causing a large interpolation error at the time of interpolating lattice points in a look-up table obtained by measuring color values on color charts since the amount of color material which is used at the time of outputting the color charts is changed by the process for limiting the total use amount of color material.

In the image forming apparatus with limitation of the total use amount of color material, a certain amount is set as a set amount at which the total use amount of color material is started to be limited, and a process for gradually reducing CMYK values having the total use amount of color material exceeding the set amount is performed, in order to maintain as much as possible smooth progression of pixel values before and after limitation of the total use amount of color material is imposed. For this reason, it is desired to create a color profile which enables printing with accurate color reproduction by accurately interpolating lattice points in a look-up table, for an image forming apparatus which selectively performs, on CMYK values having the total use amount of color material exceeding the set amount, the process for reducing the total use amount of color material.

SUMMARY

The present invention is achieved in view of the problems described above. Therefore, an object of the present invention is to provide a profile creation method, a non-transitory computer readable recording medium stored with a profile creation program, and a profile creating apparatus, for creating a color conversion profile which enables printing with accurate color reproduction, for an image forming apparatus which forms an image by selectively performing, on input color values having the total use amount of color material exceeding set amount, a process for reducing the total use amount of color material.

To achieve at least one of the abovementioned objects, a profile creation method reflecting one aspect of the present invention is a profile creation method for creating a color conversion profile for an image forming apparatus which forms an image by selectively performing, on an input color value with total use amount of color material exceeding a set amount, a process for reducing the total use amount, by interpolating lattice points in a look-up table indicating correspondence between an input color value input to the image forming apparatus and an output color value in a device-independent color space indicating an output color to be output from the image forming apparatus corresponding to the input color value, and includes the steps of: (a) determining whether or not a point of an input color value with the total use amount of color material being equal to the set amount exists between two adjacent lattice points in the look-up table; and (b) when it is determined in the step (a) that the point of the input color value corresponding to the set amount exists between the two lattice points, calculating an output color value for an interpolation point set between the two lattice points, by a predetermined polynomial interpolation method for performing interpolation calculation by using, in addition to output color values of the two lattice points, an output color value of a lattice point other than the two lattice points.

Preferably, the profile creation method further includes the step of (c) when it is determined in the step (a) that the point of the input color value corresponding to the set amount does not exist between the two lattice points, calculating the output color value of the interpolation point by a different interpolation method from the predetermined polynomial interpolation method.

In the profile creation method, preferably, the different interpolation method is a linear interpolation method for performing interpolation calculation by using only the output color values of the two lattice points.

Preferably, the profile creation method further includes the steps of: (d) when it is determined in the step (a) that the point of the input color value corresponding to the set amount does not exist between the two lattice points, determining whether or not the total use amount of color material defined by an input color value of the interpolation point is smaller than the set amount; and (e) when it is determined in the step (d) that the total use amount of color material defined by the input color value of the interpolation point is larger than or equal to the set amount, calculating the output color value of the interpolation point by an interpolation method different from the predetermined polynomial interpolation method and the different interpolation method.

In the profile creation method, preferably, the interpolation method different from the predetermined polynomial interpolation method and the different interpolation method is a polynomial interpolation method different from the predetermined polynomial interpolation method.

The objects, features, and characteristics of this invention other than those set forth above will become apparent from the description given herein below with reference to preferred embodiments illustrated in the accompanying drawings.

DETAILED DESCRIPTION

Hereinafter, an embodiment of the present invention will be described in detail with reference to the accompanying drawings.

Figure 1:
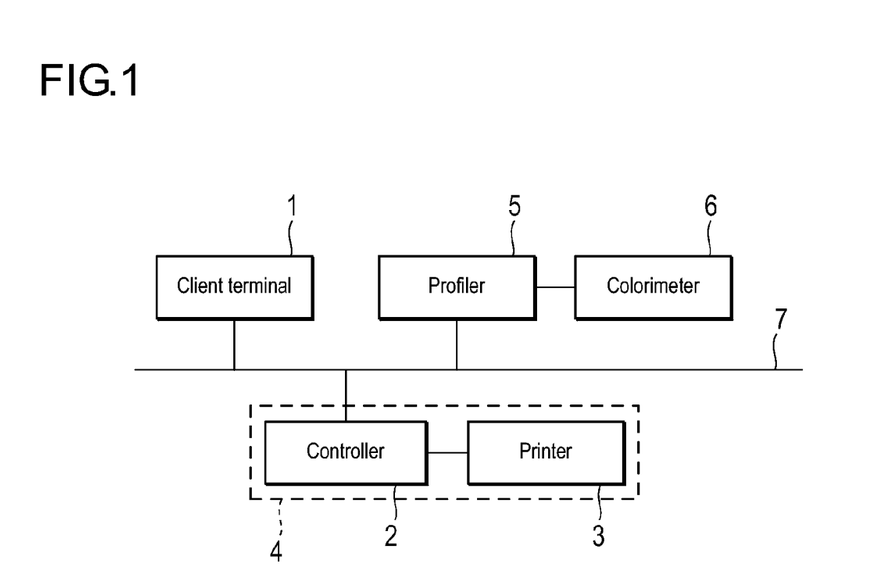
FIG. 1 is a block diagram illustrating an overall configuration of a print system to which a profile creating apparatus according to an embodiment of this invention is applied.

FIG. 1 is a block diagram illustrating an overall configuration of a print system to which a profile creating apparatus according to an embodiment of this invention is applied.

As illustrated in FIG. 1, the print system includes a client terminal 1, an image forming apparatus 4, a profiler 5, and a colorimeter 6. The client terminal 1, the image forming apparatus 4, and the profiler 5 are connected to each other via a network 7 to be able to communicate with each other.

The image forming apparatus 4 includes a controller 2 and a printer 3, which are locally connected to each other. The controller 2 and the printer 3 are connected to each other via a dedicated interface bus such as an IEEE 1394 serial bus or a universal serial bus (USB), for example. The profiler 5 and the colorimeter 6 are connected to each other via a dedicated line.

The network 7 comprises a local area network (LAN) connecting computers and networking equipment according to a standard such as Ethernet, fiber distributed data interface (FDDI), or wireless fidelity (Wi-Fi), or a wide area network (WAN) connecting LANs to each other with dedicated lines. Alternatively, the controller 2 and the printer 3 may be connected to each other via the network 7. In addition, the kinds and the number of devices connected to the network 7 are not limited to those in the example illustrated in FIG. 1.

Figure 2:
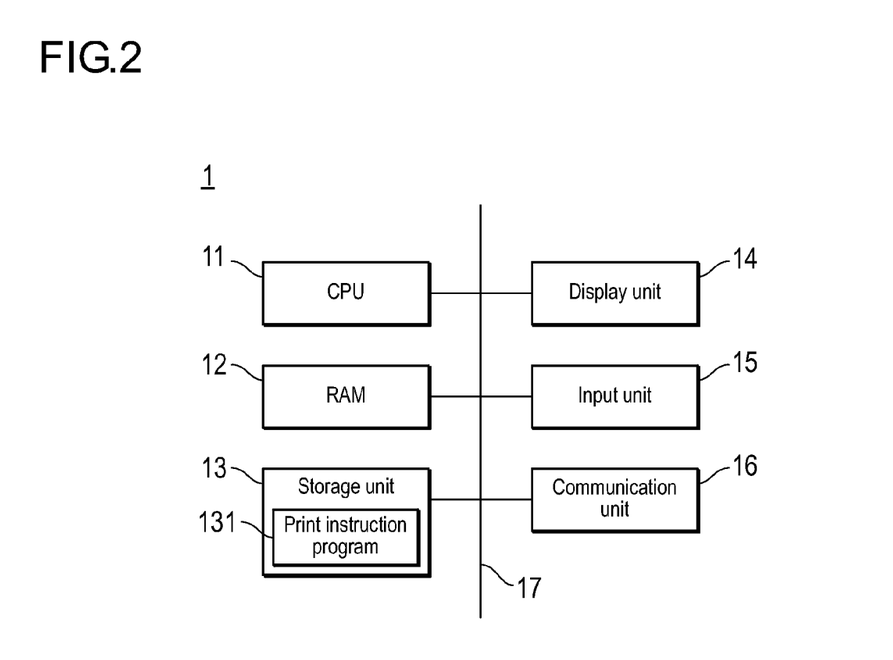
FIG. 2 is a block diagram illustrating a schematic configuration of a client terminal.

FIG. 2 is a block diagram illustrating a schematic configuration of the client terminal 1. The client terminal 1 is a general personal computer (PC), for example.

The client terminal 1 includes a central processing unit (CPU) 11, a random access memory (RAM) 12, a storage unit 13, a display unit 14, an input unit 15, and a communication unit 16, which are connected to each other via a bus 17 for sending and receiving signals.

The CPU 11 controls each of the above units and performs various kinds of arithmetic processing according to programs. The RAM 12 serves as a work space for temporally storing programs and data. The storage unit 13 comprises a read only memory (ROM) and a hard disk, which store various programs including the operating system (OS), and various data. Moreover, in the storage unit 13, a print instruction program 131 is installed, the print instruction program 131 being for converting a document file to print data described in a page description language, which can be interpreted by the controller 2, and instructing the image forming apparatus 4 to print the print data.

The display unit 14 is, for example, a liquid crystal display, and displays various types of information. The input unit 15 includes a pointing device, such as a mouse, and a keyboard, for example, and is used to input various types of information. The communication unit 16 is an interface for communicating with other devices via the network 7, and uses a standard such as Ethernet, FDDI, or Wi-Fi.

Figure 3:
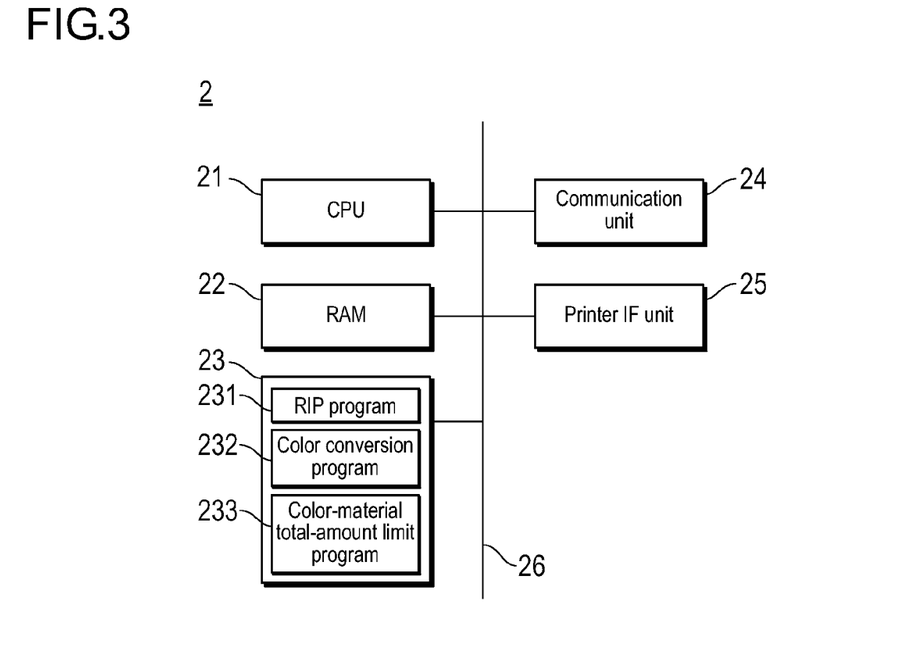
FIG. 3 is a block diagram illustrating a schematic configuration of a controller.

FIG. 3 is a block diagram illustrating a schematic configuration of the controller 2. The controller 2 includes a CPU 21, a RAM 22, a storage unit 23, a communication unit 24, and a printer interface (IF) unit 25, which are connected to each other via a bus 26 for sending and receiving signals. In the following, description is omitted for the above units of the controller 2 each having the same function as that of a corresponding one of the units of the client terminal 1, to avoid redundant description.

The printer IF unit 25 is an interface for communicating with the printer 3, which is locally connected to the controller 2.

The storage unit 23 stores a raster image processing (RIP) program 231 for analyzing print data described in a page description language and then generating bitmap image data, a color conversion processing program 232 for converting the CMYK values of each pixel of image data by using a color profile, and a color-material total-amount limit processing program 233 for selectively performing, on the CMYK values having the total use amount of color material exceeding set amount, a process for reducing the total use amount of color material.

Figure 4:
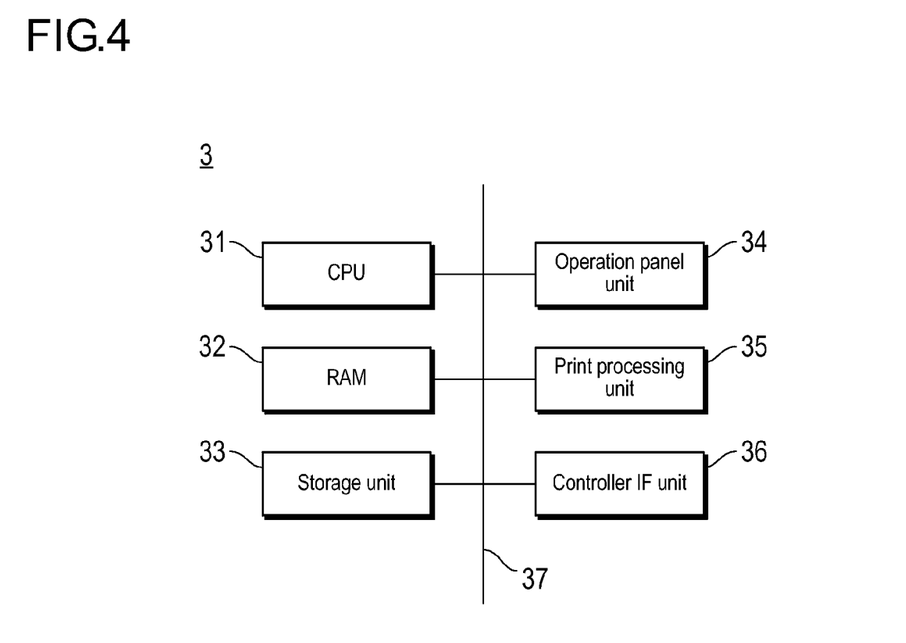
FIG. 4 is a block diagram illustrating a schematic configuration of a printer.

FIG. 4 is a block diagram illustrating a schematic configuration of the printer 3. The printer 3 includes a CPU 31, a RAM 32, a storage unit 33, an operation panel unit 34, a print processing unit 35, and a controller IF unit 36, which are connected to each other via a bus 37 for sending and receiving signals. In the following, description is omitted for the above units of the printer 3 each having the same function as that of a corresponding one of the units of the client terminal 1, to avoid redundant description.

The operation panel unit 34 is used to display various types of information and input various instructions. The print processing unit 35 prints an image based on image data received from the controller 2 on a recording sheet such as paper, by using a known image forming process such as an electrophotographic process. The print processing unit 35 forms an image by using toners (color materials) of four colors, i.e., cyan (C), magenta (M), yellow (Y), and black (K). The controller IF unit 36 is an interface for communicating with the controller 2.

As described above, the controller 2 and the printer 3 form the image forming apparatus 4. The image forming apparatus 4 forms an image by selectively performing, on input CMYK values having the total use amount of color material exceeding the set amount, a process for reducing the total use amount of color material.

Figure 5:
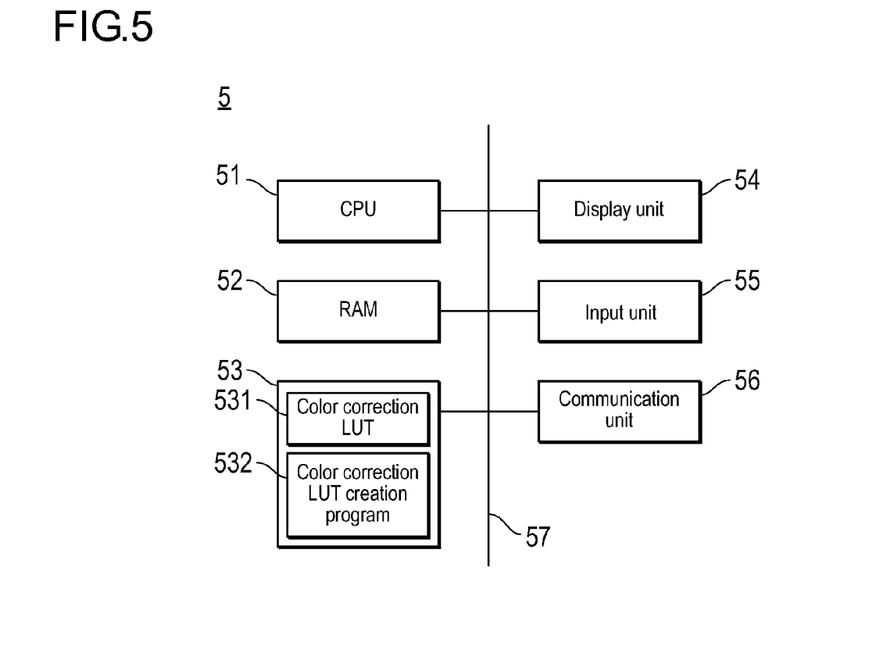
FIG. 5 is a block diagram illustrating a schematic configuration of a profiler.

FIG. 5 is a block diagram illustrating a schematic configuration of the profiler 5. The profiler 5 functioning as a profile creating apparatus is a general PC, for example.

The profiler 5 includes a CPU 51, a RAM 52, a storage unit 53, a display unit 54, an input unit 55, and a communication unit 56, which are connected to each other via a bus 57 for sending and receiving signals. Since the above respective units of the profiler 5 are the same as the above respective units of the client terminal 1, description thereof is omitted.

The communication unit 56 is connected to the colorimeter 6 via a dedicated line. The colorimeter 6 includes three kinds of sensors corresponding to the respective three primary colors of light, i.e., red, green, and blue, for example, and measures colors on the basis of output values (RGB values) for each part of a color image from the three kinds of sensors.

The storage unit 53 stores a color correction look-up table (LUT) 531 such as an International Color Consortium (ICC) device profile. In addition, the storage unit 53 also stores a color correction LUT creation program 532 for creating the color correction LUT 531.

The CPU 51 functions as a set-amount determination unit and a calculation unit by executing the color correction LUT creation program 532. The set-amount determination unit determines whether or not a point of CMYK values having the total use amount of color material being equal to the set amount exists between each two adjacent lattice points in a CMYK-to-L*a*b* LUT. The calculation unit calculates L*a*b* values of an interpolation point set between each two lattice points, by using a predetermined polynomial interpolation method or a linear interpolation method. Concrete operations performed in the process by each unit will be described later.

The client terminal 1, the controller 2, the printer 3, and the profiler 5 may include components other than those described above, or may omit some of the above-described components. Moreover, the colorimeter 6 may be a sensor attached to the printer 3, unlike this embodiment.

In the print system configured as described above, a color profile is created for the image forming apparatus 4, which selectively performs, on the input CMYK values having the total use amount of color material exceeding the set amount, the process for reducing the total use amount of color material. In the following, with reference to FIG. 6 to FIG. 10, the operation of the print system for creating a color profile for the image forming apparatus 4 will be described.

First, a color-material total-amount limit process performed by the image forming apparatus 4 will be described. In the image forming apparatus 4, a certain amount is set as a set amount at which the total use amount of color material is started to be limited, in order to maintain as much as possible smooth progression of pixel values before and after limitation of the total use amount of color material is imposed. The color-material total-amount limit process for selectively performing a process for gradually reducing CMYK values is executed on CMYK values having the total use amount of color material (corresponding to the total of the CMYK values in this embodiment) exceeding the set amount.

More specifically, assume that the upper limit of the total use amount of color material is denoted by TL (TL<1020=255×4), the set amount at which the total use amount of color material is started to be limited is denoted by TS (TS<TL), the input CMYK values of a target pixel are denoted respectively by $C_i, M_i, Y_i, K_i$ ($0 \leq C_i, M_i, Y_i, K_i \leq 255$), and the total of the input CMYK values is denoted by TA (TA<1020). In this case, when TA>TS, total T of the CMYK values after the color-material total-amount limit process is expressed by Equation (1) below.

$$T=(TL-TS)/(1020-TS)\times(TA-TS)+TS \quad (1)$$

On the basis of the total T calculated by the Equation (1) above, the CMYK values (values for a pixel) $C_r, M_r, Y_r, K_r$ after the color-material total-amount limit process are expressed respectively by Equations (2) to (5) below.

$$C_r=C_i\times T/TA \quad (2)$$

$$M_r=M_i\times T/TA \quad (3)$$

$$Y_r=Y_i\times T/TA \quad (4)$$

$$K_r=K_i\times T/TA \quad (5)$$

When TA≤TS, the input CMYK values $C_i, M_i, Y_i, K_i$ are used directly as the CMYK values $C_r, M_r, Y_r, K_r$ after the color-material total-amount limit process, respectively.

For example, assume that the upper limit TL=765 and the set amount TS=638. In this case, when the input CMYK values are C=128, M=128, Y=128, and K=128, the total TA of the CMYK values=512<TS and consequently the CMYK values after the color-material total-amount limit process are C=128, M=128, Y=128, and K=128 without change. By contrast, when the input CMYK values are C=191, M=191, Y=191, and K=191, the total TA=764>TS and consequently the CMYK values after the color-material total-amount limit process are C=170, M=170, Y=170, and K=170 according to Equations (1) to (5) above.

The controller 2 of the image forming apparatus 4 performs the above-described color-material total-amount limit process on the image data obtained by performing the RIP process on the print data. Then, the controller 2 performs a color conversion process on the image data after the color-material total-amount limit process, by using the color profile (color correction LUT 531) acquired from the profiler 5. Then, the printer 3 of the image forming apparatus 4 forms an image based on the image data after the color conversion process, on a sheet. Note that the controller 2 may perform the above-described RIP process, color-material total-amount limit process, and color conversion process simultaneously. Alternatively, the above-described color-material total-amount limit process and color conversion process may be performed by the printer 3.

As described above, a color profile is created for the image forming apparatus 4, which selectively performs the process for reducing the total use amount of color material, on the input CMYK values having the total use amount of color material exceeding the set amount TS. In this embodiment, as a color profile for the image forming apparatus 4, a CMYK-to-L*a*b* LUT is created, which presents the correspondence between input CMYK values input to the image forming apparatus 4 and L*a*b* values (i.e., output color values in a device-independent color space) of output colors output from the image forming apparatus 4 corresponding respectively to the input CMYK values.

Specifically, first, the range from 0, which is the minimum value, to 255, which is the maximum value, for each of the C, M, Y, and K, is divided into four, and the image forming apparatus 4 forms 625 patch images corresponding to the 625 respective combinations of C×M×Y×K: 5×5×5×5=625 points for the five levels, i.e., 0, 64, 128, 191, and 255. Then, the colors of the 625 patch images are measured in order by the colorimeter 6, thereby obtaining L*a*b* values of each patch image. Thereafter, the interpolation process is performed on the CMYK-to-L*a*b* LUT obtained by acquiring the L*a*b* values of each patch image, thereby creating a color profile.

Figure 6:
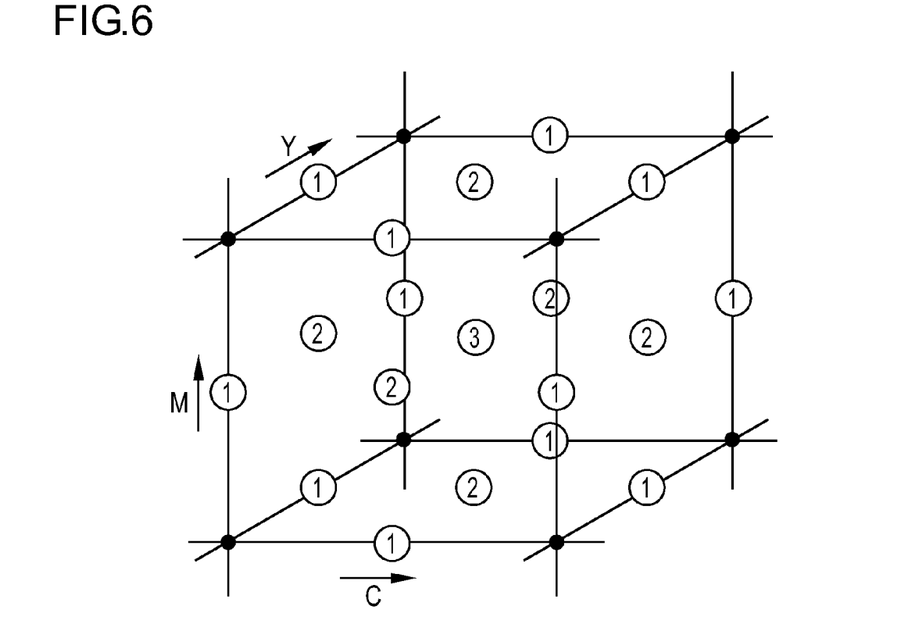
FIG. 6 is a diagram illustrating an example of an order in which an interpolation process is performed on a CMY three-dimensional look-up table (LUT).

FIG. 6 is a diagram illustrating an example of the order in which the interpolation process is performed on a CMY three-dimensional LUT. In FIG. 6, the lattice points indicated by black circles are lattice points corresponding to input CMYK values for which measured color values (L*a*b* values) are already acquired. The profiler 5 performs the interpolation process on the lattice points numbered with 1, 2, and 3 in this order illustrated in FIG. 6, to thereby increase lattice points of CMY 5×5×5 and extend to lattice points of CMY 9×9×9. After performing interpolation on the lattice points of CMY 5×5×5 to obtain the lattice points of CMY 9×9×9 in each of all the five levels of K, the profiler 5 similarly performs calculation for interpolating of the five points of K to obtain nine points of K, by using each of the lattice points of CMY 9×9×9. In this way, it is possible to obtain L*a*b* values for the CMYK combinations by extending the lattice points to 9×9×9×9=6561 points, although actual measurement is performed only on patch images of 5×5×5×5=625 points.

In the following, with reference to FIG. 7 and FIG. 8, the operation of the profiler 5 for interpolating lattice points in a CMYK-to-L*a*b* LUT will be described in detail.

Figure 7:
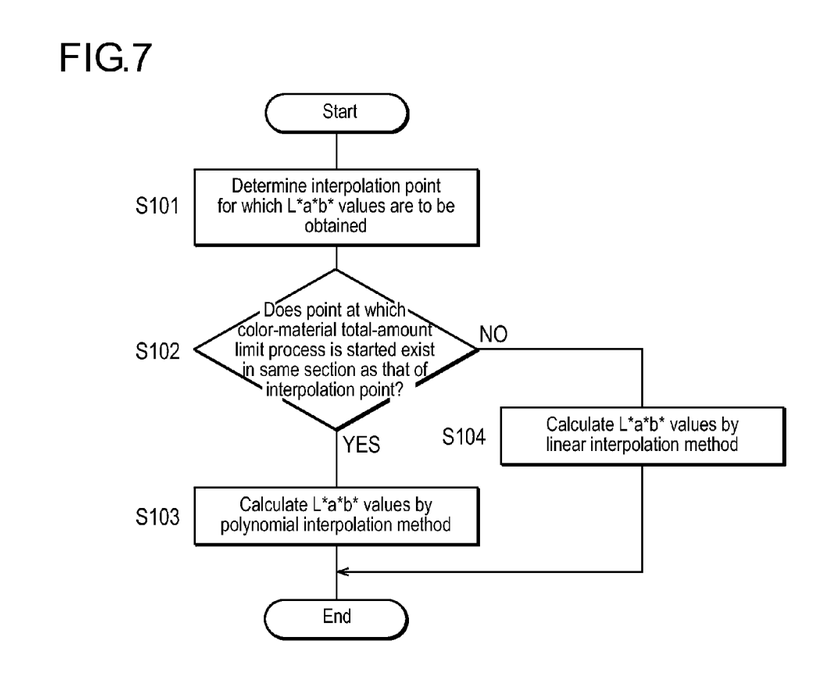
FIG. 7 is a flowchart illustrating a procedure of the interpolation process executed by the profiler.

FIG. 7 is a flowchart illustrating a procedure of the interpolation process performed by the profiler 5. The algorithm presented in the flowchart in FIG. 7 is stored as a program in the storage unit 53 of the profiler 5, and is executed by the CPU 51.

First, the profiler 5 determines an interpolation point for which L*a*b* values are to be obtained (Step S101). More specifically, the profiler 5 determines, as an interpolation point for which L*a*b* values are to be obtained, a single point (a single set of CMYK values) between two adjacent lattice points among the lattice points in the CMYK-to-L*a*b* LUT obtained by measuring colors of the patch images.

Then, the profiler 5 determines whether or not a point at which application of the color-material total-amount limit process is started exists in the same section as that of the interpolation point (Step S102). More specifically, the profiler 5 determines whether or not a point at which application of the color-material total-amount limit process is started exists between the above two lattice points having therebetween the interpolation point determined by the operation in Step S101. The above-mentioned point at which application of the color-material total-amount limit process is started, is a point of the CMYK values having the total use amount of color material being equal to the set amount TS, and more specifically, is a point located on the line connecting the two adjacent lattice points and having the total use amount of color material according to the CMYK values of the point being equal to the set amount TS at which the total use amount of color material is started to be limited (see Equation (1)). As described above, the total use amount of color material is limited for the input CMYK values having the total use amount of color material exceeding the set amount TS.

Figure 8:
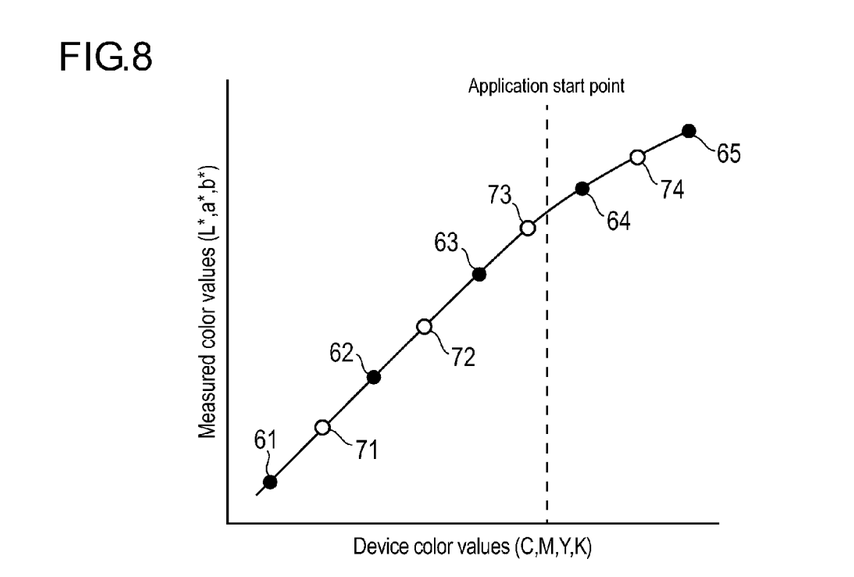
FIG. 8 is a graph for illustrating the interpolation process.

FIG. 8 is a graph for illustrating the interpolation process. In FIG. 8, points 61 to 65 indicated by black circles are lattice points for which measured color values (L*a*b* values) are already acquired, and points 71 to 74 indicated by white circles are interpolation points for which L*a*b* values are to be obtained. In FIG. 8, the vertical axis represents the measured color values and the horizontal axis represents the color value of the remaining color component when the color values of three of the color components C, M, Y, and K are fixed. In addition, the broken line in FIG. 8 indicates the position of the point at which application of the color-material total-amount limit process is started.

For example, when the color values of the color components C, Y, and K are fixed at C=128, Y=128, and K=128, the horizontal axis corresponds to the range of the values of 384 to 639 (M=0 to 255), and the point at which application of the color-material total-amount limit process is started is, for example, the point of the CMYK values (C=128, M=176, Y=128, and K=128) having the total use amount of color material being equal to the set amount TS=560.

In FIG. 8, the application start point indicated by the broken line exists between the lattice points 63 and 64, and does not exist between the lattice points 61 and 62, between the lattice points 62 and 63, and between the lattice points 64 and 65. Accordingly, it is determined, for an interpolation point 73 between the lattice points 63 and 64, that the point at which application of the color-material total-amount limit process is started exists in the same section as that of the interpolation point, while it is determined, for each of the other interpolation points 71, 72, and 74, that the point at which application of the color-material total-amount limit process is started does not exist in the same section as that of the interpolation point.

When it is determined that the point at which application of the color-material total-amount limit process is started exists in the same section as that of the interpolation point, in the operation in Step S102 (Yes in Step S102), the profiler 5 calculates the L*a*b* values of the interpolation point by a polynomial interpolation method (Step S103), and then terminates the process. More specifically, the profiler 5 calculates the L*a*b* values of the interpolation point by a polynomial interpolation method of performing interpolation calculation by using, in addition to the L*a*b* values of the two adjacent lattice points having the interpolation point therebetween, the L*a*b* values of a different lattice point. The polynomial interpolation method to be used may be the spline interpolation method, the Bezier interpolation method, the Lagrange interpolation method, the Newton interpolation method, or the like, but is not limited to these methods.

By contrast, when it is determined that the point at which application of the color-material total-amount limit process is started does not exist in the same section as that of the interpolation point, in the operation in Step S102 (No in Step S102), the profiler 5 calculates the L*a*b* values of the interpolation point by a linear interpolation method (Step S104), and then terminates the process. More specifically, the profiler 5 calculates the L*a*b* value of the interpolation point by a linear interpolation method of performing interpolation calculation by using only the L*a*b* values of the two adjacent lattice points having the interpolation point therebetween.

As described above, by the process in the flowchart illustrated in FIG. 7, it is determined whether or not the point at which application of the color-material total-amount limit process is started exists in the same section as that of the interpolation point, and the interpolation method to be used for calculating the L*a*b* values of the interpolation point is switched according to the determination result. Specifically, when the point at which application of the color-material total-amount limit process is started exists in the same section as that of the interpolation point, the L*a*b* values of the interpolation point are calculated by a polynomial interpolation method. On the other hand, when the point at which application of the color-material total-amount limit process is started does not exist in the same section as that of the interpolation point, the L*a*b* values of the interpolation point are calculated by a linear interpolation method.

Refer to FIG. 8 again. The lattice points 61 to 63, which are located on the left of the point at which application of the color-material total-amount limit process is started (i.e., on the left of the broken line), are linearly aligned. By contrast, the lattice points 64 and 65, which are located on the right of the point at which application of the color-material total-amount limit process is started, is not located on the extension of the straight line connecting the lattice points 61 to 63, and the inclination of the straight line connecting the lattice points 64 and 65 is smaller than that of the straight line connecting the lattice points 61 to 63, in consequence of the color-material total-amount limit process. Hence, the interpolation point 73 between the lattice points 63 and 64 is located above the straight line connecting the lattice points 63 and 64.

For this reason, it is difficult, due to a large interpolation error, to obtain L*a*b* values for the interpolation point 73 located between the lattice points 63 and 64 (i.e., in the same section as that of the point at which application of the color-material total-amount limit process is started) accurately by a linear interpolation method. However, in this embodiment, a polynomial interpolation method is used for the interpolation point 73 located between the lattice points 63 and 64, which makes an interpolation error small and thereby makes it possible to obtain L*a*b* values for the interpolation point 73 accurately.

As to the other interpolation points 71, 72, and 74, L*a*b* values can be obtained accurately by a linear interpolation method.

As described above, according to this embodiment, the L*a*b* values of the interpolation point existing in the same section as that of the point of CMYK values at which the total use amount of color material is started to be limited, is calculated by a polynomial interpolation method. This enables accurate interpolation between lattice points in the CMYK-to-L*a*b* LUT. Hence, it is possible to create a color profile which enables printing with accurate color reproduction, for an image forming apparatus for forming an image by selectively performing, on input CMYK values having the total use amount of color material exceeding the set amount TS, the process for reducing the total use amount of color material.

In addition, in the print system of this embodiment, an L*a*b*-to-CMYK LUT is created on the basis of the CMYK-to-L*a*b* LUT created as described above. Since a technique used for creating an L*a*b*-to-CMYK LUT on the basis of the CMYK-to-L*a*b* LUT is a general technique for creating a color conversion profile (see Japanese Patent Application Laid-Open No. 2004-356952, for example), detailed description is omitted.

(Modified Example)

In the above-described embodiment, L*a*b* values are obtained by a linear interpolation method, for an interpolation point which does not exist in the same section as that of the point at which application of the color-material total-amount limit process is started. However, in FIG. 8, as for the interpolation point 74 located on the right of the point at which application of the color-material total-amount limit process is started, the L*a*b* values may be obtained by a polynomial interpolation method.

Figure 9:
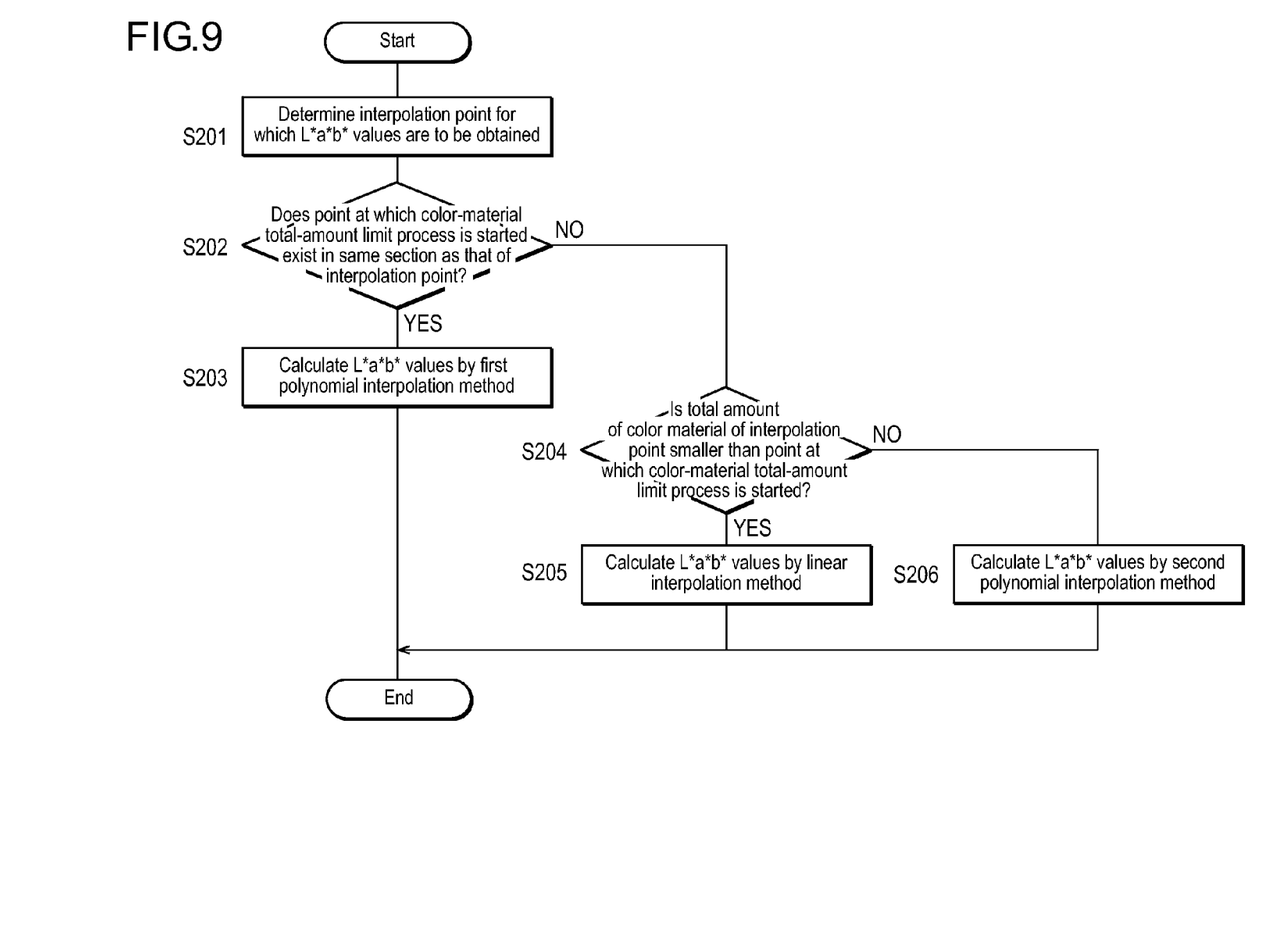
FIG. 9 is a flowchart illustrating a procedure of an interpolation process according to a modified example.

FIG. 9 is a flowchart illustrating a procedure of an interpolation process according to a modified example. In this modified example, the CPU 51 of the profiler 5 functions as a use-amount determination unit for determining, whether or not the total use amount of color material defined by the CMYK values of the interpolation point is smaller than the set amount TS.

The operations in Steps S201 to S202 are the same as those in Steps S101 to S102 in FIG. 7, and hence detailed description is omitted.

In the operation in Step S202, when it is determined that the point at which application of the color-material total-amount limit process is started exists in the same section as that of the interpolation point (Yes in Step S202), the profiler 5 calculates L*a*b* values by a first polynomial interpolation method (Step S203), and then terminates the process. More specifically, the profiler 5 calculates the L*a*b* values of the interpolation point by the first polynomial interpolation method of performing interpolation calculation by using, in addition to the L*a*b* values of the two adjacent lattice points having the interpolation point therebetween, the L*a*b* values of a different lattice point.

On the other hand, when it is determined in the operation in Step S202 that the point at which application of the color-material total-amount limit process is started does not exist in the same section as that of the interpolation point (No in Step S202), the profiler 5 determines whether or not the total amount of color material of the interpolation point is smaller than the point at which application of the color-material total-amount limit process is started (Step S204). More specifically, the profiler 5 determines whether or not the total use amount of color material (corresponding to the total of the CMYK values in this embodiment) defined by the CMYK values of the interpolation point is smaller than the set amount TS (see Equation (1)).

When it is determined that the total amount of color material of the interpolation point is smaller than the point at which application of the color-material total-amount limit process is started (Yes in Step S204), the profiler 5 calculates L*a*b* values by a linear interpolation method (Step S205), and then terminates the process. More specifically, the profiler 5 calculates the L*a*b* values of the interpolation point by a linear interpolation method of performing interpolation calculation by using only the L*a*b* values of the two adjacent lattice points having the interpolation point therebetween.

On the other hand, when it is determined that the total amount of color material of the interpolation point is larger than or equal to the point at which application of the color-material total-amount limit process is started (No in Step S204), the profiler 5 calculates the L*a*b* values by a second polynomial interpolation method (Step S206), and then terminates the process. More specifically, the profiler 5 calculates the L*a*b* values of the interpolation point by the second polynomial interpolation method of performing interpolation calculation by using, in addition to the L*a*b* values of the two adjacent lattice points having the interpolation point therebetween, the L*a*b* value of a different lattice point. Here, the second polynomial interpolation method is different from the first polynomial interpolation method.

As described above, by the process in the flowchart illustrated in FIG. 9, the L*a*b* values of an interpolation point (the interpolation point 74 in FIG. 8) which does not exist in the same section as that of the point at which application of the color-material total-amount limit process is started and which has the total use amount of color material being larger than or equal to the set amount TS are calculated by a polynomial interpolation method. With this configuration, it is possible to obtain L*a*b* values of each interpolation point accurately even when CMYK values are changed nonlinearly in consequence of the color-material total-amount limit process.

Lastly, the linear interpolation method and the polynomial interpolation method which are used in the interpolation process will be described.

<Linear Interpolation Method>

Assume that the color system of an interpolation point is represented by L(m)*, a(m)*, and b(m)*, the color system of each of the lattice points having the interpolation point therebetween is represented by L(i)*, a(i)*, and b(i)* (i=1 to 2), and Y values of the points are represented by Y(m) and Y(i) (i=1 to 2). In this case, L(m)*, a(m)*, and b(m)* are expressed by Equations (6) to (8) below, respectively.

$$L(m)^* = (L(2)^* - L(1)^*)/(Y(2) - Y(1)) \times (Y(m) - Y(1)) + L(1)^* \quad (6)$$

$$a(m)^* = (a(2)^* - a(1)^*)/(Y(2) - Y(1)) \times (Y(m) - Y(1)) + a(1)^* \quad (7)$$

$$b(m)^* = (b(2)^* - b(1)^*)/(Y(2) - Y(1)) \times (Y(m) - Y(1)) + b(1)^* \quad (8)$$

In the above, the Y value is a value defined for each patch image corresponding to the lattice point, and Y(m) is specified when the interpolation point is determined.

<Polynomial Interpolation Method>

The Neville's algorithm based on the Newton interpolation method will be described as an example of a polynomial interpolation method.

Figure 10:
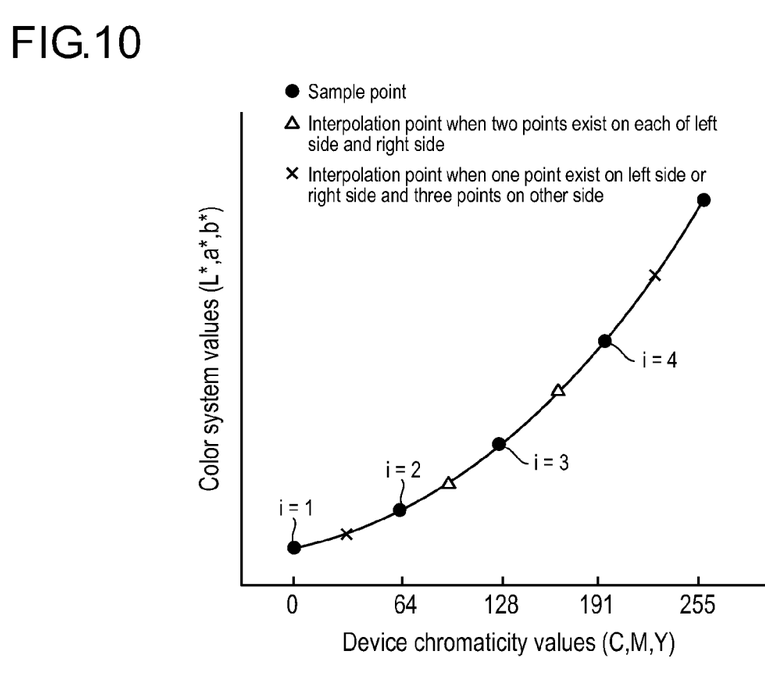
FIG. 10 is a graph for illustrating an example of a polynomial interpolation method.

FIG. 10 is a graph for illustrating an example of the polynomial interpolation method. In FIG. 10, the points indicated by black circles are lattice points for which L*a*b* values are already acquired, and the points indicated by Δ or x are interpolation points for which L*a*b* values are to be obtained.

Among these interpolation points, different interpolation functions are used between the case in which two lattice points exist on each of the left side and right side of the interpolation point as each point indicated by Δ and the case in which one lattice point exists on the left side or right side of the interpolation point and three lattice points exist on the other side of the interpolation point as each point indicated by x.

Specifically, assume that the color system of an interpolation point is represented by L(m)*, a(m)*, and b(m)*, and the color system of each lattice point is represented by L(i)*, a(i)*, and b(i)* (i=1 to 4). In this case, for example, L(m)*, a(m)*, and b(m)* of the interpolation point which is located between the lattice point (i=2) and the lattice point (i=3) and indicated by Δ are expressed by Equations (9) to (11) below, respectively.

$$L(m)^* = -(1/16)L(1)^* + (9/16)L(2)^* + (9/16)L(3)^* - (1/16)L(4)^* \quad (9)$$

$$a(m)^* = -(1/16)a(1)^* + (9/16)a(2)^* + (9/16)a(3)^* - (1/16)a(4)^* \quad (10)$$

$$b(m)^* = -(1/16)b(1)^* + (9/16)b(2)^* + (9/16)b(3)^* - (1/16)b(4)^* \quad (11)$$

By contrast, for example, L(m)*, a(m)*, and b(m)* of the interpolation point located between the lattice point (i=1) and the lattice point (i=2) and indicated by x are expressed by Equations (12) to (14) below, respectively.

$$L(m)^* = (5/16)L(1)^* + (15/16)L(2)^* - (5/16)L(3)^* + (1/16)L(4)^* \quad (12)$$

$$a(m)^* = (5/16)a(1)^* + (15/16)a(2)^* - (5/16)a(3)^* + (1/16)a(4)^* \quad (13)$$

$$b(m)^* = (5/16)b(1)^* + (15/16)b(2)^* - (5/16)b(3)^* + (1/16)b(4)^* \quad (14)$$

The present invention is not limited only to the above-described embodiment, and various modifications can be made within the scope of the claims.

For example, in the above-described embodiment, L*a*b* values are calculated by a linear interpolation method for each interpolation point which does not exist in the same section as that of the point at which application of the color-material total-amount limit process is started, in the flowchart illustrated in FIG. 7. However, L*a*b* values may be calculated by a polynomial interpolation method also for each interpolation point which does not exist in the same section as that of the point at which application of the color-material total-amount limit process is started. For example, the Newton interpolation method is used for the interpolation point which exists in the same section as that of the point at which application of the color-material total-amount limit process is started, while the spline interpolation method is used for each interpolation point which does not exist in the same section as that of the point at which application of the color-material total-amount limit process is started.

Moreover, in the above-described embodiment, description has been given by taking the process of reducing the amounts of the respective CMYK components at the same rate, as an example of the process for reducing the total use amount of color material. However, the process for reducing the total use amount of color material is not limited to this, and a process following any of various rules such as one to reduce only the amounts of the respective CMY components, excluding the K component, at the same rate, or the like may be applied, for example. Alternatively, under color removal (UCR) or gray component replacement (GCR) can be used as the process.

Further, in the above-described embodiment, the profiler as a profile creating apparatus is provided separately from the client terminal and the controller. However, the profile creating apparatus may be integrated with the client terminal and/or the controller, and thereby implemented as a partial function included in one or some of these devices.

Further, in the above-described embodiment, the controller and the printer, which are provided separately, form the image forming apparatus. However, the image forming apparatus may be formed of a controller and a printer which are integrally provided.

Further, in the above-described embodiment, description has been given by taking an electrophotographic image forming apparatus as an example of the image forming apparatus for which a color conversion profile is created. However, the image forming apparatus may be an ink-jet image forming apparatus.

Further, in the above-described embodiment, the lattice points of 5×5×5×5 in the LUT are interpolated to obtain an extended LUT with lattice points of 9×9×9×9. However, the number of lattice points in the LUT is not limited to the above. The lattice points of 4×4×4×4 in a LUT may be interpolated to obtain an extended LUT with lattice points of 11×11×11× 11, for example.

Further, in the above-described embodiment, description has been given by taking the CMYK-to-L*a*b* LUT as an example of a color conversion profile for the image forming apparatus. However, the color conversion profile is not limited to the above, and an RGB-to-XYZ LUT may be applied, for example.

The units and the methods for performing the various processes in the print system according to the above-described embodiment can be implemented by any of a dedicated hardware circuit or a computer installed with appropriate programs. The programs may be provided in the form of being stored in a non-transitory computer readable recoding medium such as a flexible disk or a compact disc read-only memory (CD-ROM), or may be provided online via a network such as the Internet. In this case, the programs stored in a non-transitory computer readable recording medium are generally transferred to and stored in a storage unit such as a hard disk or the like. In addition, each of the programs may be provided as separate application software or may be integrated, as a function of the print system, in the software of the device.

What is claimed is:

1. A profile creation method for creating a color conversion profile for an image forming apparatus which forms an image by selectively performing, on an input color value with total use amount of color material exceeding a set amount, a process for reducing the total use amount, by interpolating lattice points in a look-up table indicating correspondence between an input color value input to the image forming apparatus and an output color value in a device-independent color space indicating an output color to be output from the image forming apparatus corresponding to the input color value, the profile creation method comprising the steps of:
   (a) determining whether or not a point of an input color value with the total use amount of color material being equal to the set amount exists between two adjacent lattice points in the look-up table; and
   (b) when it is determined in the step (a) that the point of the input color value corresponding to the set amount exists between the two lattice points, calculating an output color value for an interpolation point set between the two lattice points, by a predetermined polynomial interpolation method for performing interpolation calculation by using, in addition to output color values of the two lattice points, an output color value of a lattice point other than the two lattice points.

2. The profile creation method as claimed in claim 1, further comprising the step of
   (c) when it is determined in the step (a) that the point of the input color value corresponding to the set amount does not exist between the two lattice points, calculating the output color value of the interpolation point by a different interpolation method from the predetermined polynomial interpolation method.

3. The profile creation method as claimed in claim 2, wherein the different interpolation method is a linear interpolation method for performing interpolation calculation by using only the output color values of the two lattice points.

4. The profile creation method as claimed in claim 2, further comprising the steps of:
   (d) when it is determined in the step (a) that the point of the input color value corresponding to the set amount does not exist between the two lattice points, determining whether or not the total use amount of color material defined by an input color value of the interpolation point is smaller than the set amount; and
   (e) when it is determined in the step (d) that the total use amount of color material defined by the input color value of the interpolation point is larger than or equal to the set amount, calculating the output color value of the interpolation point by an interpolation method different from the predetermined polynomial interpolation method and the different interpolation method.

5. The profile creation method as claimed in claim 4, wherein the interpolation method different from the predetermined polynomial interpolation method and the different interpolation method is a polynomial interpolation method different from the predetermined polynomial interpolation method.

6. A non-transitory computer readable recording medium stored with a profile creation program for creating a color conversion profile for an image forming apparatus which forms an image by selectively performing, on an input color value with total use amount of color material exceeding a set amount, a process for reducing the total use amount, by interpolating lattice points in a look-up table indicating correspondence between an input color value input to the image forming apparatus and an output color value in a device-independent color space indicating an output color to be output from the image forming apparatus corresponding to the input color value, the program causing a computer to execute a process comprising the steps of:
   (a) determining whether or not a point of an input color value with the total use amount of color material being equal to the set amount exists between two adjacent lattice points in the look-up table; and
   (b) when it is determined in the step (a) that the point of the input color value corresponding to the set amount exists between the two lattice points, calculating an output color value for an interpolation point set between the two lattice points, by a predetermined polynomial interpolation method for performing interpolation calculation by using, in addition to output color values of the two lattice points, an output color value of a lattice point other than the two lattice points.

7. The non-transitory computer readable recording medium as claimed in claim 6, the process further comprising the step of
   (c) when it is determined in the step (a) that the point of the input color value corresponding to the set amount does not exist between the two lattice points, calculating the output color value of the interpolation point by a different interpolation method from the predetermined polynomial interpolation method.

8. The non-transitory computer readable recording medium as claimed in claim 7, wherein the different interpolation method is a linear interpolation method for performing interpolation calculation by using only the output color values of the two lattice points.

9. The non-transitory computer readable recording medium as claimed in claim 7, the process further comprising the steps of:
   (d) when it is determined in the step (a) that the point of the input color value corresponding to the set amount does not exist between the two lattice points, determining whether or not the total use amount of color material defined by an input color value of the interpolation point is smaller than the set amount; and
   (e) when it is determined in the step (d) that the total use amount of color material defined by the input color value of the interpolation point is larger than or equal to the set amount, calculating the output color value of the interpolation point by an interpolation method different from the predetermined polynomial interpolation method and the different interpolation method.

10. The non-transitory computer readable recording medium as claimed in claim 9, wherein the interpolation method different from the predetermined polynomial interpolation method and the different interpolation method is a polynomial interpolation method different from the predetermined polynomial interpolation method.

11. A profile creating apparatus for creating a color conversion profile for an image forming apparatus which forms an image by selectively performing, on an input color value with total use amount of color material exceeding a set amount, a process for reducing the total use amount, by interpolating lattice points in a look-up table indicating correspondence between an input color value input to the image forming apparatus and an output color value in a device-independent color space indicating an output color to be output from the image forming apparatus corresponding to the input color value, the profile creating apparatus comprising:
- a set-amount determination unit configured to determine whether or not a point of an input color value with the total use amount of color material being equal to the set amount exists between two adjacent lattice points in the look-up table; and
- a calculation unit configured to calculate an output color value for an interpolation point set between the two lattice points, by a predetermined polynomial interpolation method for performing interpolation calculation by using, in addition to output color values of the two lattice points, an output color value of a lattice point other than the two lattice points, when it is determined, by the set-amount determination unit, that the point of the input color value corresponding to the set amount exists between the two lattice points.

12. The profile creating apparatus as claimed in claim 11, wherein, when it is determined, by the set-amount determination unit, that the point of the input color value corresponding to the set amount does not exist between the two lattice points, the calculation unit calculates the output color value of the interpolation point by a different interpolation method from the predetermined polynomial interpolation method.

13. The profile creating apparatus as claimed in claim 12, wherein the different interpolation method is a linear interpolation method for performing interpolation calculation by using only the output color values of the two lattice points.

14. The profile creating apparatus as claimed in claim 12, further comprising
a use-amount determination unit configured to determine whether or not the total use amount of color material defined by an input color value of the interpolation point is smaller than the set amount, when it is determined, by the set-amount determination unit, that the point of the input color value corresponding to the set amount does not exist between the two lattice points, wherein,
when it is determined, by the use-amount determination unit, that the total use amount of color material defined by the input color value of the interpolation point is larger than or equal to the set amount, the calculation unit calculates the output value of the interpolation point by an interpolation method different from the predetermined polynomial interpolation method and the different interpolation method.

15. The profile creating apparatus as claimed in claim 14, wherein the interpolation method different from the predetermined polynomial interpolation method and the different interpolation method is a polynomial interpolation method different from the predetermined polynomial interpolation method.

* * * * *